Figure 1:
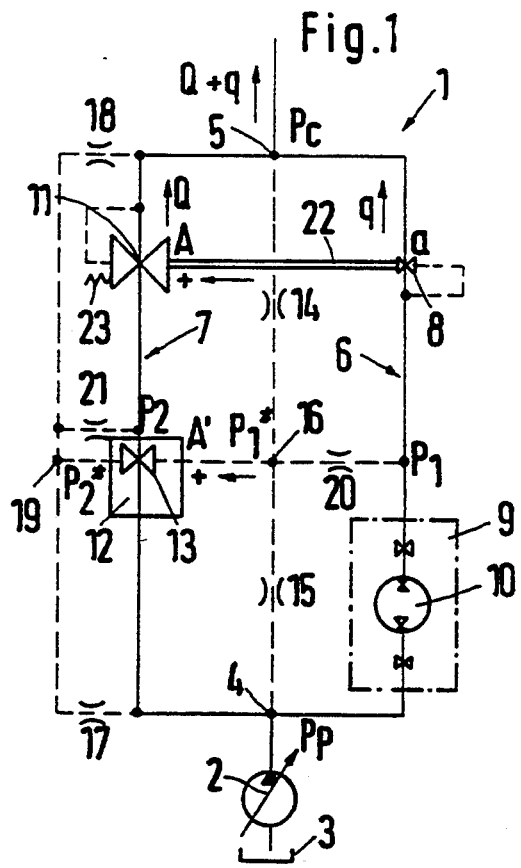

United States Patent [19]
Thomsen

[11] Patent Number: 5,390,693
[45] Date of Patent: Feb. 21, 1995

[54] FLOW AMPLIFIER

[75] Inventor: Svend E. Thomsen, Nordborg, Denmark

[73] Assignee: Danfoss A/S, Nordborg, Denmark

[21] Appl. No.: 185,941

[22] PCT Filed: Jul. 6, 1992

[86] PCT No.: PCT/DK92/00216
§ 371 Date: Jan. 14, 1994
§ 102(e) Date: Jan. 14, 1994

[87] PCT Pub. No.: WO93/03946
PCT Pub. Date: Mar. 4, 1993

[30] Foreign Application Priority Data
Aug. 14, 1991 [DE] Germany ............................ 4126846

[51] Int. Cl.⁶ ............................................. B62D 5/09
[52] U.S. Cl. ...................................... 137/110; 60/384
[58] Field of Search ........................... 60/384; 137/110

[56] References Cited
U.S. PATENT DOCUMENTS 4,759,182 7/1988 Haarstad ................. 60/384
4,914,913 4/1990 Germain ................. 60/384
4,947,894 8/1990 Obidin ................. 60/384 X Primary Examiner—Robert G. Nilson
Attorney, Agent, or Firm—Lee, Mann, Smith, McWilliams, Sweeney & Ohlson

[57] ABSTRACT

A flow amplifier (1) with an inlet (4) and an outlet (5) is provided, between which a first branch (6), through which a flow of a fluid to be amplified is flowing, with a first throttling device (8), the throttle resistance of which is adjusted in dependence on the pressure across and by the flow rate through the first throttling device, and a second branch (7) with a second throttling device (11), the throttle resistance of which is adjusted in dependence on the throttle resistance of the first throttling device. In a flow amplifier of that kind, the amplification factor is intended to be made independently of pressure losses in the generation of the flow to be amplified. For that purpose, at least one pressure-divider (14, 15; 17, 18) with a central take-off point (16; 19) is provided, which is supplied by a pressure difference between inlet (4) and outlet (5), the pressure at the central take-off point (15, 19) controlling the flow rate through the second throttling device (11).

15 Claims, 1 Drawing Sheet

FLOW AMPLIFIER

The invention relates to a flow amplifier with an inlet and an outlet, between which a first branch, through which a flow of a fluid to be amplified is flowing, with a first throttling device, the throttle resistance of which is adjusted in dependence on the pressure across and by the flow rate through the first throttling device, and a second branch with a second throttling device, the throttle resistance of which is adjusted in dependence on the throttle resistance of the first throttling device, are arranged parallel to one another.

A flow amplifier of that kind is known from U.S. Pat. No. 4,914,913. Such a flow amplifier is used in a hydraulic standard control system for heavy vehicles in which a control unit, which controls the flow amplifier, supplies a control cylinder with oil. The amplification factor of the flow amplifier can be varied in dependence on the speed of rotation of the steering handwheel, so that the amplification factor increases as the steering handwheel speed increases. This is achieved in that the second throttling device is opened more at a higher steering handwheel speed than at a lower steering handwheel speed, with the result that the throttle resistance of the second throttling device is reduced. At any rate, in the case of the known flow amplifier the amplification factor is additionally dependent on the pressure drop and the friction around the measuring motor, so that precision adjustment elements have to be provided here.

The invention is based on the problem of producing a flow amplifier which can be kept substantially unaffected by detrimental influences.

This problem is solved in a flow amplifier of the kind mentioned in the introduction by providing at least one pressure-divider with a central take-off point, which is supplied by a pressure difference between inlet and outlet or a pressure difference depending thereon, the pressure at the central take-off point controlling the flow rate through the second throttling device.

The pressure controlling the flow rate through the second throttling device can then be controlled without being influenced by the pressure drop at the measuring motor or by other variables. It is solely dependent on a fixedly predeterminable or adjustable pressure which moves between the pressure at the inlet and the pressure at the outlet of the flow amplifier. The flow rate through the second throttling device is therefore influenced firstly by the flow rate through the first throttling device. Secondly, it is influenced by the pressure at the central take-off point of the pressure-divider. Both variables are combined by multiplication with one another, so that by superimposing the two flows through the first and through the second throttling device the flow through the first throttling device is amplified. The amplification can be proportional, the proportionality factor being determined substantially by the throttle resistance of the second throttling device. A progressive or degressive amplification is also possible.

In a preferred construction, the division ratio of the pressure-divider is adjustable. Because the pressure at the central take-off point controls the flow rate through the second throttling device, a change in the division ratio also generates a change in the flow rate through the second throttling device. A flow amplifier with a variable or adjustable amplification factor is obtained in this way. The amplification factor, that is, the proportionality factor between the flow to be amplified and the sum of the two flows through the first and the second throttling device, can be changed by a simple change in the division ratio.

For that purpose, the pressure-divider has a divider-throttling device between the central take-off point and each of its ends, at least one of which devices has an adjustable throttle resistance. By adjusting the throttle resistance the division ratio of the pressure-divider can be varied.

It is preferable for at least one divider-throttling device to have an electromagnetic valve. The throttle resistance can easily be changed from outside with an electromagnetic valve by varying an electrical current. Electrical currents are, however, easy to regulate or control, so that this provides a very convenient method of changing the division ratio.

It is especially preferred for the electromagnetic valve to be cyclically controlled. A cyclically controlled electromagnetic valve assumes two states alternately, namely, completely open and completely closed, the ratio of the times during which the electromagnetic valve is closed to the times during which the electromagnetic valve is open being a measure of the opening degree of the electromagnetic valve.

At least one divider-throttling device advantageously has a fixed throttle respectively parallel to and in series with the electromagnetic valve. These two throttles serve as a safety measure. Should the electromagnetic valve block in an opened position, the throttle lying in series limits the maximum flow rate. Should the electromagnetic valve block in a closed position, the parallel throttle still allows an emergency flow.

To control the flow rate, in a preferred construction a pressure-adjusting device which controls the pressure across the second throttling device in dependence on the pressure at the central take-off point is provided. By changing the pressure across the second throttling device, under otherwise unchanged conditions the flow rate through the second throttling device can be controlled. The greater is the pressure across the second throttling device, the more fluid will flow through the second throttling device under otherwise unchanged conditions. If the pressure is reduced, the flow rate decreases correspondingly. The fact that the flow rate varies with the root of the pressure difference across the second throttling device must be taken into account in the calculation.

To change the pressure, the pressure-adjusting device preferably has a third throttling device, the throttle resistance of which is determined by a force difference between the force exerted by the pressure at the central take-off point and a counter-force. As soon as the pressure at the central take-off point acts on a working surface of the third throttling device, it exerts a force on the throttling device which changes, that is to say, increases or decreases, the throttle resistance of this throttling device. In the reverse direction a counter-force acts on the throttling device so that ultimately the difference between these two forces is the decisive factor for the throttle resistance of the third throttling device.

Preferably, the counter-force is here created by a pressure at the central take-off point of a second pressure-divider. This enables the counter-force to be varied as well, so that the throttle resistance of the third throttling device and thus the pressure across the second throttling device adjustable by the pressure-adjusting device can be varied within wide limits.

Advantageously, at least one of the pressure-dividers is connected both to the inlet and to the outlet. The pressure difference across the pressure-divider then corresponds to the pressure difference between the inlet and the outlet. The pressure at the central take-off point can then be adjusted using a large part of this pressure range.

In another preferred construction, at least one pressure-divider is connected at one end to the inlet or the outlet, while the other end is connected to a point in the flow direction upstream of the first and second throttling device respectively.

The pressure drop across the first and second throttling device respectively influences the pressure at the central take-off point of the relevant pressure-divider which, under certain circumstances, can preferably be used to compensate for specific effects. The two possibilities can also be combined. In that case, the central take-off point of the relevant pressure-divider is connected not only by way of a divider-throttling device to the inlet and outlet, but also to the point in the flow direction upstream of the first and second throttling device respectively.

In a further construction, provision can be made for the first throttling device to exert a force and for the pressure at the central take-off point to exert a force oppositely directed to that force on the second throttling device, the throttle resistance of the second throttling device being defined by the force difference between the two forces. The flow rate is here no longer or not only controlled by way of the pressure difference across the second throttling device. Another decisive factor now is that the throttle resistance of the second throttling device can be influenced as such also by the pressure at the central take-off point of the pressure-divider. This pressure can lead to a decrease, and also to an increase, in the throttle resistance, compared to the case in which the throttle resistance of the second throttling device is determined exclusively by the flow rate through the first throttling device.

To that end, provision is made for the first throttling device to have a first setting device and for the second throttling device to have a second setting device which are joined to one another mechanically. A movement of the first setting device, which is caused by the flow rate through the first throttling device, is then transmitted automatically to the second setting device, with the result that the throttle resistance of the second throttling device is defined.

In a further construction, the two flow rate possibilities can be combined with one another, the third throttling device also having a third setting device which is joined mechanically to the two other setting devices. It is thus not only the throttle resistance of the second throttling device that is adjusted in dependence on the pressure at the central take-off point, but also the pressure difference across the second throttling device.

For the throttle resistances to be readily changed, provision is preferably made for the change in the throttle resistance of the first, second and/or third throttling device to be effected by changing the effective opening cross-section. This is easier than, for example, extending the flow path in the throttling device.

Figure 2:
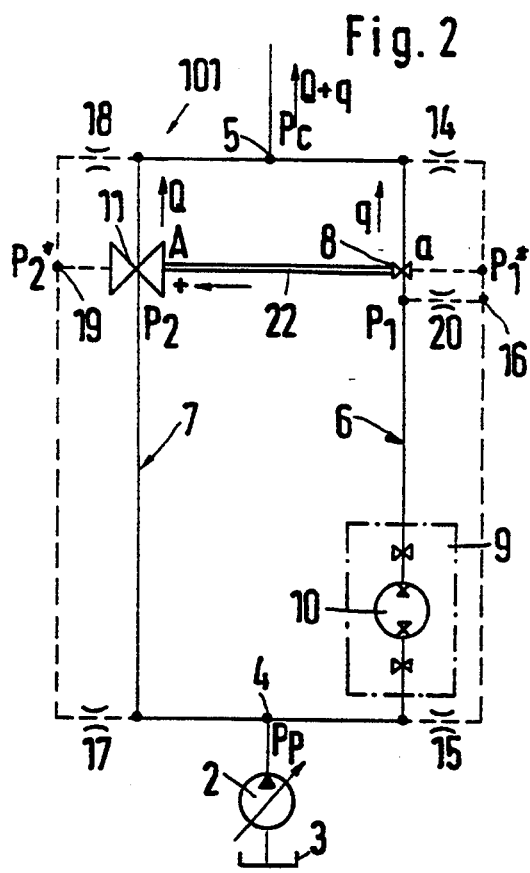
Figure 3:
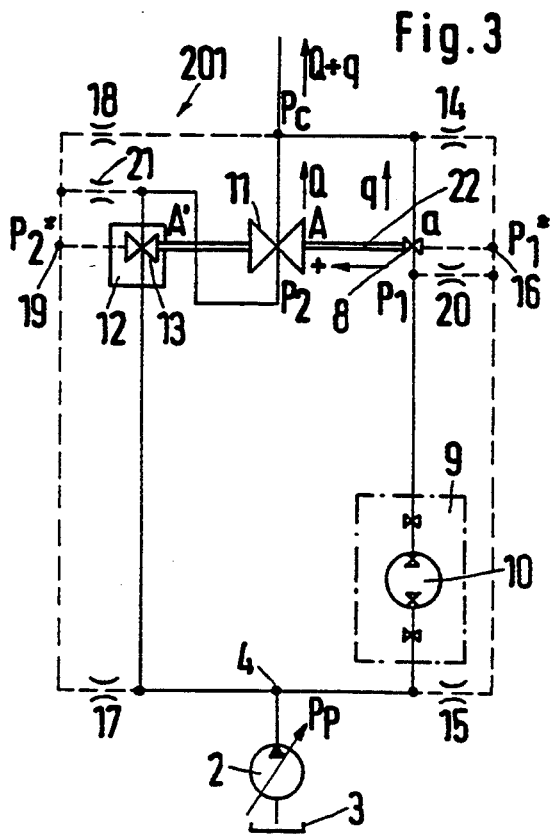
Figure 4:
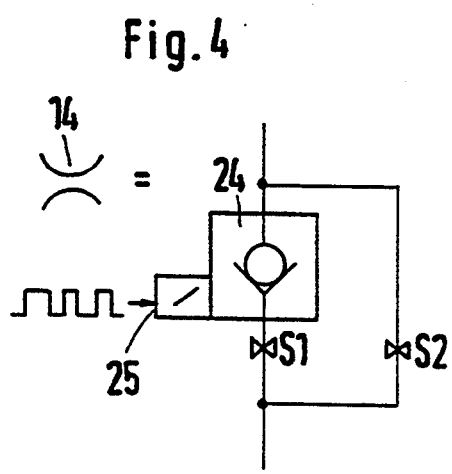

The invention will be described hereinafter with reference to a preferred embodiment in conjunction with the drawing, in which FIG. 1 shows a first embodiment of a flow amplifier, FIG. 2 shows a second embodiment of the flow amplifier, FIG. 3 shows a third embodiment of the flow amplifier, FIG. 4 shows a diagrammatic representation of a divider-throttling device, A flow amplifier 1 has an inlet 4 fed by a pump 2 from a tank 3 and an outlet 5, as illustrated, with a load, not illustrated in detail. Between the inlet 4 and the outlet 5 a first branch 6 and a second branch 7 are connected parallel to one another. The return flow from the load to the tank is not shown. The first branch 6 has a first throttling device 8, which lies in series with a control unit 9 which contains a measuring motor 10. The measuring motor 10 controls the flow q through the first branch 6. The first throttling device 8 is arranged in the flow direction downstream of the control unit 9.

The second branch 7 contains a second throttling device 11. Upstream of the second throttling device 11 is a pressure-adjusting device 12, which controls the pressure across the second throttling device 11. For that purpose the pressure-adjusting device 12 has a third throttling device 13.

Also provided is a first pressure-divider which consists of divider-throttling devices 14, 15 which are connected in series with the inlet 4 and outlet 5. Between the divider-throttling devices 14 and 15 there is provided a central take-off point 16. A second pressure-divider comprising divider-throttling devices 17, 18 is also provided, which is likewise connected between the inlet 4 and outlet 5 and has a central take-off point 19. The central take-off point 16 of the first pressure-divider 14–16 is connected by way of a further divider-throttling device 20 to a point P1 in the flow direction upstream of the first throttling device 8. The second pressure-divider 17–19 is connected by way of a further divider-throttling device 21 to a point P2 in the flow direction upstream of the second throttling device 11.

The throttle resistance of the first throttling device 8 is changed by a setting device, not illustrated, which determines the size of an effective opening cross-section a. The throttle resistance of the second throttling device 11 is determined by a second setting device, not illustrated, which determines the size of an opening cross-section A. The first and the second setting device are connected mechanically to one another by a rod 22. They can also be provided on the same valve slider, as is known, for example, from DE 29 32 847 C2. The first setting device is acted upon by a force from the pressure upstream of the first throttling device 8. The second setting device is acted upon by a force in the opposite direction by a spring 23 and the pressure downstream of the second throttling device 11.

The third throttling device 13 of the pressure-adjusting device 12 also has a third setting device, not illustrated, which is acted upon on one side by the pressure at the central take-off point 16 of the first pressure-divider and on the other side, that is, in the opposite direction, by the pressure at the central take-off point 19 of the second pressure-divider. The setting device determines the size of an effective cross-section A', which in turn determines the throttle resistance of the third throttling device 13.

The flow amplifier 1 operates as follows: the measuring motor 10 of the control apparatus 9 generates a flow q through the first branch 6, which flows through the first throttling device 8. This flow q creates across the first throttling device 8 a pressure difference $P_1 - P_o$, which also acts on the first setting device. A state of equilibrium ensues, in which the throttle resistance of the first throttling device 8 defined by the effective opening cross-section a with the flow q exactly produces the pressure drop $P_1 - P_c$. At the same time, the first setting device displaces the second setting device of the second throttling device 11 with the aid of the rod 22, so that an effective opening cross-section A is here created, which in this particular case is proportional to the flow q. A progressive or regressive dependency is also possible, depending on how the setting device is constructed. The flow Q through the second throttling device 11 is dependent firstly on the throttle resistance of the second throttling device 11, and secondly also on the pressure difference across the second throttling device 11. Because $P_c$, that is, the pressure at the outlet 5, is fixed, the pressure at the point $P_2$ is the variable determining the pressure difference. The pressure at the point $P_2$ can be set with the help of the pressure-adjusting device 12. For that purpose, the third setting device of the third throttling device 13 is loaded on one side by the pressure at the central take-off point 16 and on the other side by the pressure at the central take-off point 19, so that an effective opening cross-section A' is set. The flow Q flowing through the pressure-adjusting device 12 causes a pressure drop across the third throttling device 13, so that the pressure at the point $P_2$ is less than the pressure $P_p$ at the inlet 4.

Without the pressure-dividers 14-16 and 17-19, that is, with only the divider-throttling devices 20 and 21, pressures $P_1^*$ and $P_2^*$ would be set at the points 16 and 19 respectively, which correspond respectively to the pressures at the points $P_1$ and $P_2$. The pressure across the second throttling device 11 is already therefore independent of the pressure drop at the measuring motor 19[1]. The pressure values $P_1^*$ and $P_2^*$ at the central take-off points 16 and 19 of the pressure-dividers can now be influenced by the divider-throttling devices 14, 15, 17, 18 so that they deviate from the pressure value at the points $P_1$ and $P_2$ respectively. A pressure drop across the second throttling device 11 which differs from the pressure drop across the first throttling device 8 can therefore be achieved. The pressure drop across the second throttling device 11 is, however, the second determining component next to the throttle resistance for the flow Q. If, for example, the throttle resistance of the divider-throttling device 17 is decreased, the pressure $P_2^*$ at the central take-off point 19 increases. The effective opening cross-section A' of the third throttling device 13 becomes smaller. The pressure at the point $P_2$ decreases. The pressure difference $P_2 - P_c$ becomes smaller. The flow Q therefore also decreases. The amplification, that is, the ratio $(Q+q)/q$ decreases. If, on the other hand, the throttle resistance of the divider-throttling device 18 is made smaller, the pressure $P_2^*$ at the central take-off point 19 drops. The pressure difference across the second throttling device 11 becomes greater. The amplification increases. The same applies to the other pressure-divider 14-16. By reducing the throttle resistance of the divider-throttling device 14 the pressure $P_1^*$ at the central take-off point 16 drops. The effective opening cross-section A' therefore becomes smaller. The pressure at the point $P_2$ decreases. The amplification decreases. The reverse applies when the divider-throttling device 15 is changed in the direction of a smaller throttle resistance. With the help of the divider-throttling devices the amplification can therefore be adjusted and in principle is it sufficient to change the throttle resistance of one of the previously mentioned divider-throttling devices 14, 15, 17, 18.

[1] Presumably in error for "10"; "19"is the central take-off point of the second pressure divider-translator.

The pressure-dividers need not be connected both to the outlet 5 and the inlet 4. When one of the two divider throttling devices 14 or 15 is present, then instead of the other divider-throttling device 15, 14 the divider-throttling device 20 can be provided. When one of the two divider-throttling devices 17, 18 is present, then instead of the other divider-throttling device 18, 17 the divider-throttling device 21 can be present. For each pressure-divider only two divider-throttling devices are therefore required. An operative flow amplifier 1 is obtained, however, also in the embodiment illustrated.

FIG. 4 shows by way of example, with reference to the divider-throttling device 14, how the divider-throttling devices 14-16 and 17-19 can be constructed, when they are intended to serve as variable divider-throttling devices, that is, as divider-throttling devices with a variable throttle resistance. In this case, an electromagnetic valve 24 is provided, to which a sequence of square-wave pulses are supplied by way of a signal connection 25. The duty factor of the square-wave pulses is in this case decisive for the effective opening cross-section. At a duty factor of 50%, the electromagnetic valve 24 is, for example, half open. Parallel to the electromagnetic valve 24 there is a fixed throttle $S_2$. In series with the electromagnetic valve 24 a fixed throttle $S_1$ is connected in series. The fixed throttle $S_1$ limits the flow through the electromagnetic valve 24 when it is intended to block in the fully open position. The fixed throttle $S_2$ allows a minimum flow through the divider-throttling device when the electromagnetic valve 24 is designed to block in the fully closed position.

FIG. 2 shows a further flow amplifier 101, in which parts that correspond to those of FIG. 1 have been provided with the same reference numerals. The flow Q through the second branch 7 can also be controlled in this flow amplifier 101. However, in this case the pressure difference is not adjusted by way of the second throttling device 11, on the contrary, the effective opening cross-section A of the second throttling device 11 is changed in dependence on the pressure at the central take-off point 19. The pressure $P_2^*$ at the central take-off point 19 counteracts the pressure $P_1^*$ at the central take-off point 16 of the other pressure-divider. By changing the two pressures, the measure of the opening of the opening cross-section A, that is to say, the throttle resistance of the second throttling device 11, can be adjusted. In this case, however, it is necessary for the two points $P_1$ and 16 to be connected to one another by means of the divider-throttling device 20, so that the effective opening cross-section a in the first throttling device 8 can be set in dependence on the flow q.

FIG. 3 shows a third embodiment of the flow amplifier 201, which in principle is a combination of the embodiments of the flow amplifier 1 according to FIG. 1 and 101 according to FIG. 2. Parts that correspond to those of FIG. 1 have been provided with the same reference numerals. Here, the setting device of the third throttling device 13 of the pressure-adjusting device 12 is connected mechanically by way of the rod 22 to the setting devices of the first and second throttling device 8, 11. The pressure $P_1^*$ at the central take-off point 16 therefore acts by way of the rod 22 on one side of the setting device, while the pressure of the setting device $P_2^*$ at the central take-off point 19 acts in the opposite direction. Without the divider-throttling devices 14, 15 and 17, 18, an equilibrium would become established on the setting devices such that $P_1=P_1^*$ and $P_2=P_2^*$. By changing the throttle resistances at at least one of the divider-throttling devices 14, 15 and 17, 18, the pressures $P_1^*$ and $P_2^*$ can be caused to deviate from the pressures $P_1$ and $P_2$ respectively. A change in the amplification factor of the flow amplifier 201 can thereby be achieved.

It is claimed:

1. A flow amplifier having an inlet and an outlet, a first branch between said inlet and said outlet, a flow of a fluid to be amplified flowing in said first branch, a first throttling device, throttle resistance of said throttling device being adjusted in dependence on fluid pressure across and by fluid flow rate through the first throttling device, and a second branch having a second throttling device, throttle resistance of said second throttling device being adjusted in dependence on throttle resistance of the first throttling device, said branches being arranged parallel to one another, and including at least one pressure-divider with a central take-off point, said pressure-divider being supplied by a pressure difference between said inlet and said outlet or a pressure difference depending thereon, the pressure at the central take-off point controlling the flow rate through the second throttling device.

2. A flow amplifier according to claim 1, in which the pressure-divider has a division ratio which is adjustable.

3. A flow amplifier according to claim 2, in which the pressure-divider has a divider-throttling device between the central take-off point and each of its ends, at least one of said devices having an adjustable throttle resistance.

4. A flow amplifier according to claim 3, in which at least one throttling device includes an electromagnetic valve.

5. A flow amplifier according to claim 4, in which the electromagnetic valve is cyclically controlled.

6. A flow amplifier according to claim 4, in which at least one throttling device has a fixed throttle parallel to and in series with the electromagnetic valve.

7. A flow amplifier according to claim 1, including a pressure-adjusting device, said pressure-adjusting device including means to control pressure across the second throttling device in dependence on the pressure at the central take-off point.

8. A flow amplifier according to claim 7, in which the pressure-adjusting device has a third throttling device, throttle resistance of said third throttling device being determined by a force difference between the force exerted by the pressure at the central take-off point and a counter-force.

9. A flow amplifier according to claim 8, in which the counter-force is created by a pressure at a central take-off point of a second pressure-divider.

10. A flow amplifier according to claim 7, in which at least one of the pressure-dividers is connected both to the inlet and to the outlet.

11. A flow amplifier according to claim 7, in which at least one pressure-divider is connected at one end to the inlet or the outlet and the other end of the pressure-divider is connected to a point in flow direction upstream of the first and second throttling devices.

12. A flow amplifier according to claim 1, in which the first throttling device exerts a force and the pressure at the central take-off point exerts a force oppositely directed to that force on the second throttling device, the throttle resistance of the second throttling device being defined by a force difference between the forces on said first and second throttling devices.

13. A flow amplifier according to claim 1, in which the first throttling device has a first setting device and the second throttling device has a second setting device, said setting devices being joined to one another mechanically.

14. A flow amplifier according to claim 13, in which the third throttling device has a third setting device which is joined mechanically to the first and second setting devices.

15. A flow amplifier according to claim 1, in which change in the throttle resistance of the first, second and/or third throttling devices is effected by changing an effective opening cross-section.

* * * * *